United States Patent
Rapp et al.

(10) Patent No.: US 9,689,408 B2
(45) Date of Patent: Jun. 27, 2017

(54) BISTABLE ACTUATOR, ACTUATOR ARRANGEMENT, METHOD FOR ACTUATION AND USE

(71) Applicant: Karlsruher Institut für Technologie, Karlsruhe (DE)

(72) Inventors: Bastian Rapp, Karlsuhe (DE); Christiane Neumann, Eggenstein-Leopoldshafen (DE); Elisabeth Wilhelm, Karlsruhe (DE); Achim Voigt, Eggenstein-Leopoldshafen (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 430 days.

(21) Appl. No.: 14/387,091

(22) PCT Filed: Jan. 31, 2013

(86) PCT No.: PCT/EP2013/000294
§ 371 (c)(1),
(2) Date: Sep. 22, 2014

(87) PCT Pub. No.: WO2013/139418
PCT Pub. Date: Sep. 26, 2013

(65) Prior Publication Data
US 2015/0083228 A1    Mar. 26, 2015

(30) Foreign Application Priority Data
Mar. 23, 2012  (DE) .................. 10 2012 005 992

(51) Int. Cl.
*F15B 15/10*    (2006.01)
*F16K 99/00*    (2006.01)
(Continued)

(52) U.S. Cl.
CPC .............. *F15B 15/10* (2013.01); *F02B 75/38* (2013.01); *F02F 3/00* (2013.01); *F02F 3/0015* (2013.01);
(Continued)

(58) Field of Classification Search
CPC .... F15B 15/10; F16K 99/0032; G09B 21/004
See application file for complete search history.

(56) References Cited

U.S. PATENT DOCUMENTS 6,354,839 B1 *   3/2002   Schmidt ............... G09B 21/003
                                                    434/112
6,575,188 B2 *   6/2003   Parunak ............ B01L 3/502738
                                                    137/251.1
(Continued)

FOREIGN PATENT DOCUMENTS

WO         0022598 A1     4/2000

OTHER PUBLICATIONS

ISR/WO, PCT/EP2013/000294 filed Jan. 31, 2013, 12 pages.
(Continued)

*Primary Examiner* — Thomas E Lazo
(74) *Attorney, Agent, or Firm* — Armstrong Teasdale LLP (57) ABSTRACT

A method for bistably actuating an actuator includes applying positive pressure in an actuator fluid supply that is fluidly connected to an actuator chamber by means of an actuator fluid supply connection, wherein a working positive pressure is generated in the actuator chamber, whereby an actuator element fluidly connected to the actuator chamber is brought from a resting position to an actuation position, pressure-tight sealing of the actuator fluid supply connection, so that the working positive pressure in the actuator chamber is maintained and the actuator element remains in the actuation position.

20 Claims, 5 Drawing Sheets

(51) Int. Cl.
*F15B 15/14* (2006.01)
*G09B 21/00* (2006.01)
*F02F 3/00* (2006.01)
*F02B 75/38* (2006.01)

(52) U.S. Cl.
CPC ...... *F15B 15/1404* (2013.01); *F16K 99/0032* (2013.01); *F16K 99/0044* (2013.01); *F16K 99/0061* (2013.01); *G09B 21/004* (2013.01); *F16K 2099/0069* (2013.01); *Y10T 137/0318* (2015.04)

(56) References Cited

U.S. PATENT DOCUMENTS

| | | | | |
|---|---|---|---|---|
| 6,807,892 | B2 * | 10/2004 | Biegelsen | F15B 15/10 91/454 |
| 7,478,792 | B2 * | 1/2009 | Oh | F15C 5/00 137/251.1 |
| 8,456,438 | B2 * | 6/2013 | Ciesla | G06F 3/0202 345/156 |
| 8,499,793 | B2 * | 8/2013 | Park | B01L 3/502738 137/828 |
| 2003/0019522 | A1 | 1/2003 | Parunak | |
| 2001/0124384 | | 7/2004 | Biegelsen et al. | |
| 2006/0219308 | A1 | 10/2006 | Oh et al. | |

OTHER PUBLICATIONS

Levent Yobas et al., "A Novel Bulk-Micromachined Electrostatic Microvalve with a Curved-Compliant Structure Applicable for a Pneumatic Tactile Display", Journal of Microelectromechanical Systems, IEEE Service Center, US vol. 10, No. 2, Jun. 1, 2001, pp. 187-196.

Neumann et al., "A Large Scale Thermal Microfluidic Valve Platform", 15th International Conference on Miniaturized System for Chemistry and Life Sciences, Oct. 2-6, 2011, 4 pages, Seattle, WA USA.

Oh, et al., "A review of Microvalves", Journal of Micromechanics and Microengineering, 16 (2006), pp. R13-R39, Institute of Physics Publishing Ltd., United Kingdom.

* cited by examiner

BISTABLE ACTUATOR, ACTUATOR ARRANGEMENT, METHOD FOR ACTUATION AND USE

CROSS REFERENCE TO RELATED APPLICATIONS

This application is a National Stage Entry of PCT/EP2013/000294 filed Jan. 31, 2013, which claims priority from German Patent Application No. DE 10 2012 005 992.2 filed Mar. 23, 2012, both of which are incorporated herein in their entirety.

BACKGROUND

The invention relates to a bistable actuator, an actuator assembly, a method for actuation, and to a use of the actuator assembly.

The provision of linear actuator strokes is of particular importance especially in micro systems engineering. Such linear actuator strokes can be used for the precise positioning of components in optics, in sensors or comparable systems. A suitable actuator is usually selected by taking into consideration boundary conditions, such as the attainable actuating pressure, the travel distance, and the positioning accuracy. In applications in micro systems engineering, however, the issue of scalability or integration density is often of particular importance. The skilled person is particularly faced with the task of arranging hundreds or thousands of these actuators in an actuator assembly or an actuator array and of interconnecting them such that each of the actuators can be controlled in a simple, energy-efficient and reliable way. Moreover, it may be desirable to provide an actuator assembly that is highly integrated, that is, which has as many individual, addressable actuators as possible on a small area.

BRIEF DESCRIPTION

One aspect relates to a method for bistably actuating an actuator, the method including the steps of:
  applying positive pressure in an actuator fluid supply that is fluidly connected to an actuator chamber by means of an actuator fluid supply connection, wherein a working positive pressure is generated in the actuator chamber, whereby an actuator element fluidly connected to the actuator chamber is brought from a resting position to an actuation position;
  pressure-tight sealing of the actuator fluid supply connection, so that the working positive pressure in the actuator chamber is maintained and the actuator element remains in the actuation position.

Advantageously, pressure-tight sealing of the actuator fluid supply connection has the effect that the working pressure in the actuator chamber is maintained regardless of whether positive pressure is applied in the actuator fluid supply. In other words, the positive pressure in the actuator fluid supply, which was required to generate the working positive pressure in the actuator chamber, whereby the actuator element was brought from the resting position to the actuation position, may still be applied or not be applied anymore. After the actuator element has transitioned to the actuation position, the positive pressure in the actuator fluid supply can advantageously be released. The bistable actuation of the actuator therefore only requires energy for changing the position of the actuator element from the resting position to the actuation position. In the resting state of the actuator, the actuator element is in the resting position and is kept stable there without any further energy supply to the actuator. In the actuation state of the actuator, the actuator element is in the actuation position and is kept stable there without any further energy supply to the actuator. Advantageously, the resting position and the actuation position are both stable without any further supply of energy.

The actuator is a fluidic or microfluidic actuator, which is actuated by means of an actuator fluid provided via the actuator fluid supply. That is, the performance of the actuator element is created by a fluid pressure of an actuator fluid, for example hydraulically or pneumatically. The actuator fluid may include a gaseous phase, a liquid phase, or a mixture thereof. In at least some embodiments, the actuator fluid is incompressible. To actuate the actuator or to displace the actuator element to the actuation position, positive pressure is applied in the actuator fluid supply. The application of positive pressure in the actuator fluid supply may include that an actuator fluid source fluidly connected to the actuator fluid supply is provided, wherein the actuator fluid source provides the actuator fluid with the desired and predetermined positive pressure. The provision may be hydraulically or pneumatically, for example from a fluid source or a fluid reservoir. The positive pressure in the actuator fluid supply acts on an actuator fluid in the actuator chamber via the actuator fluid supply connection. The actuator chamber may also be filled with actuator fluid or another fluid. Due to the positive pressure in the actuator fluid supply, actuator fluid can enter the actuator fluid supply connection at least in parts and fill the actuator chamber at least in parts. In addition to the actuator fluid, the actuator chamber and/or the actuator fluid supply connection may contain a further actuator chamber fluid, which is incompressible in particular.

Due to the positive pressure acting in the actuator fluid supply, a working positive pressure is generated in the actuator chamber when the actuator fluid supply connection is open. The working pressure in the actuator chamber corresponds substantially to the positive pressure in the actuator fluid supply. In other words, the working pressure corresponds to the positive pressure in the actuator fluid supply, with a deviation of less than about 100 hPa, preferably less than about 50 hPa.

The actuator element fluidly connected to the actuator chamber can at least partially be deformed or displaced by the working positive pressure in the actuator chamber. More specifically, the actuator element fluidly separates the actuator chamber from the exterior of the actuator or from the atmosphere. For example, the actuator element may be formed as a deformable membrane and at least partially form a wall of the actuator chamber. The working positive pressure in the actuator chamber then describes the pressure difference between the fluid pressure in the actuator chamber and the fluid pressure or air pressure in the exterior of the actuator. Accordingly, the positive pressure in the actuator fluid supply is defined as the pressure difference between the fluid pressure in the actuator fluid supply and the fluid pressure in the exterior of the actuator. Due to the effective differential pressure between the actuator chamber and the exterior of the actuator, the actuator element can at least partially be deformed or displaced. The displacement of the actuator element or a portion of the actuator element may be linear along an actuation direction A. The actuator element may be brought into precisely two actuator states, i.e. the resting position and the actuation position, wherein the actuator element can be brought from the resting position to the actuation position by being displaced along the actuation direction A. A precise adjustability of the position of the actuator element along the actuation direction A is not necessary in many cases. For example, the actuator can be part of a microfluidic valve having only two actuator states, i.e. open or closed. For example, a microfluidic channel can be closed by the actuator element extending into a microfluidic channel and closing same thereby in the actuation position. Precise positioning of the actuator element along the actuation direction A is usually not required to open and close such a microfluidic valve.

After the actuator element has been brought from the resting position to the actuation position, the actuator fluid supply connection is sealed in a pressure-tight way. In at least some embodiments, after pressure-tight sealing of the actuator fluid supply connection, the application of positive pressure in the actuator fluid supply is terminated. Since the actuator fluid supply connection is pressure-sealed, the working positive pressure in the actuator chamber is maintained. In other words, the actuator is in a stable actuation state, with the actuator element being in the actuation position. In particular, it is advantageously not necessary to continue supplying energy to the actuator, for example in the form of positive pressure in the actuator fluid supply, to keep the actuator in the actuation position. Thereby, the actuator can advantageously be operated with reduced energy expenditure. The actuation state of the actuator can also be referred to as a second stable state.

By opening the actuator fluid supply connection, the working positive pressure can escape from the actuator chamber through the actuator fluid supply connection in the direction of the actuator fluid supply when no positive pressure is applied in the actuator fluid supply. Consequently, the actuator element can be displaced in the direction opposite to the actuation direction A in order to return to the resting position (the first stable position). To this end, the actuator element may be formed to the resilient in an exemplary embodiment. Alternatively or additionally, the actuator element may comprise a restoring device or be connected to a restoring device, which applies a restoring force to the actuator element to displace it in a direction opposite to the actuation direction A when the working positive pressure in the actuator chamber falls below a predetermined value.

In at least some embodiments, pressure-tight sealing of the actuator fluid supply connection is performed by means of a liquefiable sealing medium, which is disposed in the actuator fluid supply connection and can be solidified in the actuator fluid supply connection, wherein the actuator chamber is fluidly separated from the actuator fluid supply by the solidified sealing medium. In particular, liquefying or melting and solidification of the sealing medium can be repeatable or take place several times. In particular, this does not change the physical and/or chemical properties of the sealing medium. Exemplary sealing media include one or more alkanes. In some embodiments, the sealing medium comprises paraffin having a molar mass of between 270 g/mol to about 600 g/mol. The melting temperature of the paraffin is preferably between about 45° C. and about 80° C., further preferably between about 50° C. and 60° C. The heat of fusion required to melt one kilogram of paraffin is between about 200 kJ and 240 kJ. To seal the actuator fluid supply connection in a pressure-tight or fluid-tight way, the actuator fluid supply connection is filled with the sealing medium such that the entire cross-section of the actuator fluid supply connection is filled with liquid sealing medium. The sealing medium can be brought into and/or held in a liquid state by supplying heat to the sealing medium in the actuator fluid supply connection by means of a heating element. In the case of paraffin as the sealing medium, the sealing medium needs to be heated to temperatures above about 45° or above about 80° C. The sealing medium remains in a liquid state as long as the necessary heat is being supplied. If the heating element is switched off, the temperature of the sealing medium will decrease due to the cooling via the adjacent walls of the actuator fluid supply connection and the actuator fluid contacting with the sealing medium. If the temperature of the sealing medium falls below the solidification point or the solidification temperature of about 45° C., the sealing medium will harden within the actuator fluid supply connection, whereby the actuation chamber is separated from the actuator fluid supply by the now-solid sealing medium fluidly and in a pressure-tight way. The above method requires that the actuator as a whole be operated at a temperature that is below the solidification temperature of the sealing medium. The sealing medium needs to be chosen accordingly. Alternatively, the sealing medium can be chosen such that the sealing medium is in a liquid state at the operating temperature of the actuator, so that permanent cooling of the sealing medium must be performed to pressure-seal the actuator fluid supply connection by means of the solidified medium. Active cooling of the sealing medium in the actuator fluid supply connection may e.g. be performed by means of a Peltier element as an exemplary heat sink. After the cooling element or the Peltier element has been switched off, the sealing medium is heated due to heat supply via the walls of the actuator fluid supply connection or via the actuator fluid, so that the sealing medium is melted again and the actuator fluid supply connection is not pressure-sealed anymore. Active cooling of the sealing medium by a cooling element or a Peltier element can also be used for shortening the solidification time of the sealing medium when the solidification temperature is above the operating temperature of the actuator and the sealing medium therefore needs to be heated by a heating element in order to liquefy.

In at least some embodiments, the method further includes:
  liquefying or melting the sealing medium, which is disposed in an actuator fluid supply connection between an actuator chamber and an actuator fluid supply and which fluidly separates the actuator chamber from the actuator fluid supply, wherein the molten sealing medium is at least partially displaced toward the actuator chamber upon application of the positive pressure.

In at least some embodiments, the actuator fluid supply connection is designed so as to completely include the sealing medium, so that the sealing medium does not enter the actuator chamber upon transition of the actuator to the actuation position. In other words, the liquid sealing medium can be displaced back and forth within the actuator fluid supply connection between a resting position and an actuation position depending on whether positive pressure is applied in the actuator fluid supply or not. Here, the sealing medium is only displaceable within the actuator fluid supply connection when the sealing medium is in the liquid phase. To this end, the sealing medium can be heated by means of the heating element in order to pass from a solid phase to the liquid phase. If the sealing medium solidifies within the actuator fluid supply connection, for example as the sealing medium is not heated by the heating element anymore, the sealing medium is not displaceable within the actuator fluid supply connection anymore and the actuator chamber is separated from the actuator fluid supply in a pressure-tight way.

Alternatively, liquefaction of the sealing medium may also be performed in a sealing medium reservoir instead of within the actuator fluid supply connection. Then, the method may include:
- liquefying or melting the sealing medium in a sealing medium reservoir;
- applying positive pressure to the sealing medium reservoir, wherein a sealing element is brought from an open position to a closed position so that the actuator chamber is fluidly separated from the actuator fluid supply by the sealing element, and
- solidifying the sealing medium so that the sealing element remains in the closed position.

In at least some embodiments, the sealing element is designed as an elastically formed region of the common wall of the sealing medium reservoir with the actuator fluid supply connection. Thereby, the sealing medium is advantageously separated fluidly from the actuator fluid or the actuator chamber fluid. The positive pressure between the sealing medium reservoir and the actuator fluid supply connection here describes a pressure difference between the sealing medium within the sealing medium reservoir and the actuator fluid within the actuator fluid supply connection. In other words, the sealing medium has a higher pressure than the actuator fluid, so that the closure element is deformed or displaced. In other words, the sealing element acts as a valve within the actuator fluid supply connection, which is pressure-sealed.

The sealing medium can be heated within the sealing medium reservoir by means of a heating element and thus be liquefied or melted. After the heating element has been switched off, the sealing medium loses its heat to the environment, that is to the walls of the sealing medium reservoir, so that the solidification temperature of the sealing medium is fallen below and the sealing medium solidifies. Paraffin can be used as the sealing medium as well.

In at least some embodiments, a reservoir fluid (water, compressed air and so on) is applied to the sealing medium reservoir in order to generate the positive pressure in the sealing medium reservoir. To this end, the sealing medium reservoir can be connected to the reservoir fluid supply directly or indirectly by means of a reservoir fluid supply connection. In the case of a direct connection of the reservoir fluid supply to the sealing medium reservoir, the reservoir fluid and the sealing medium can contact each other. In the case of an indirect connection of the sealing medium reservoir to the reservoir fluid supply, the reservoir fluid and the sealing medium do not contact each other. On the contrary, for example, they are both separated by an elastic membrane. The reservoir fluid supply may be fluidly connected to a reservoir fluid source, which provides the reservoir fluid with the required positive pressure.

The reservoir fluid and the actuator fluid can be identical or different. In at least some embodiments, the fluid reservoir and/or the actuator fluid are incompressible. For example, the fluid reservoir and/or the actuator fluid can include an oil, water, compressed air, or another gas.

In at least some embodiments, the method includes:
- releasing the positive pressure or applying negative pressure in the actuator fluid supply.

In at least some embodiments, the actuator fluid source that feeds the actuator fluid supply is switched off after the actuator has reached the actuation position, so that the positive pressure in the actuator fluid supply escapes. Since the actuator is bistable, it remains in the actuation position.

In at least some embodiments, the method includes:
- liquefying or melting the sealing medium in the actuator fluid supply connection, wherein the working positive pressure in the actuator chamber decreases and the actuator element returns from the actuation position to the resting position.

In at least some embodiments, the liquefied sealing medium within the actuator fluid supply connection is moved away from the actuator chamber, so that the pressure in the actuator chamber decreases due to the increase in volume, which is available to the fluid present in the actuator chamber. The actuator is then displaced opposite to the actuation direction A and returns to the resting position. After the resting position has been reached, heating of the sealing medium can be terminated so that the sealing medium solidifies again. The actuator fluid displaced from the actuator fluid supply connection by the sealing medium is displaced to the actuator fluid supply during the return to the resting position. Accordingly, the actuator fluid supply is free of pressure to receive the displaced actuator fluid. To this end, the actuator fluid supply can be connected to the outside and/or comprise a pressure compensating reservoir, which receives the actuator fluid displaced from the actuator fluid supply connection. Thus, the actuator returns to the stable state of rest.

Another aspect relates to a bistable actuator, including:
- an actuator fluid supply through which an actuator fluid can be provided and which is fluidly connected to an actuator chamber by means of an actuator fluid supply connection;
- at least one actuator element fluidly connected to the actuator chamber, which can be brought from a resting position to an actuation position by application of positive pressure;
- a sealing device with which the actuator fluid supply connection can be pressure-sealed.

In at least some embodiments, the actuator fluid supply is designed to provide the actuator fluid with positive pressure of greater than about 100 hPa, preferably greater than about 500 hPa, in particular greater than about 1000 hPa. Further in at least some embodiments, the actuator fluid supply comprises a microfluidic channel that guides the actuator fluid. The microfluidic channel has in particular a diameter of less than about 5 mm, preferably less than about 2 mm, particularly preferably less than about 1 mm, and especially less than about 0.1 mm. Accordingly, the cross-sectional area of the microfluidic channel, which forms the actuator fluid supply, can be less than about 20 mm$^2$, preferably less than about 3 mm$^2$, or about 1 mm$^2$, and in particular less than about 0.1 mm$^2$. Likewise, the actuator fluid supply connection can be formed as a microfluidic channel, which accordingly has the same diameter or cross-sectional dimension, or is smaller than e.g. the dimensions of the actuator fluid supply by a factor of about 2, preferably by a factor of about 5.

The actuator element, which is fluidly connected to the actuator chamber, can be deformed or displaced by the application of positive pressure in the actuator chamber. In particular, the actuator element can be displaced linearly along an actuation direction A. In at least some embodiments, the actuator element is formed as a resilient elastic membrane. In particular, the membrane or the actuator element forms a wall of the actuator chamber.

The sealing device in the actuator fluid supply connection acts as a valve, which can seal the actuator fluid supply in a pressure-tight or fluid-tight way. The sealing device may also comprise an actuator. For example, the sealing device may be formed as an elastically restorable region of the wall of the actuator fluid supply connection. This elastically restorable region of the wall can be displaced or deformed, for example by a fluidic or mechanical actuator, such that the cross-section of the actuator fluid supply connection is closed.

In at least some embodiments, the sealing device comprises a liquefiable sealing medium and a heating element with which the sealing medium can be liquefied. Further in at least some embodiments, the sealing medium is disposed in the actuator fluid supply connection. Further in at least some embodiments, the heating element can contact the sealing medium directly or indirectly.

In at least some embodiments, the sealing medium is immiscible with or insoluble in the actuator fluid. In other words, under normal conditions, less than about $10^{-6}$ mol/l of the actuator fluid can be dissolved in the sealing medium, or less than about $10^{-6}$ mol/l of the sealing medium can be dissolved in the actuator fluid. Alternatively or additionally, the sealing medium can be fluidly separated from the actuator fluid by an elastic membrane.

In at least some embodiments, the sealing medium is disposed in a sealing medium reservoir, which is fluidly connected to a sealing element, which can be brought from an open position to a closed position by application of positive pressure in the sealing medium reservoir, so that the actuator chamber can be fluidly separated from the actuator fluid supply by the sealing element.

In at least some embodiments, the sealing element is designed as an elastically restorable region of the wall of the actuator fluid supply connection. By applying the positive pressure in the sealing medium reservoir, the elastically restorably formed sealing element can be deformed or displaced in particular such that the wall of the actuator fluid supply connection in the region of the sealing element deforms such that the actuator fluid supply connection is closed. The sealing medium may particularly be an incompressible fluid, such as liquid paraffin. To seal the actuator fluid supply connection, the sealing medium reservoir can be heated by means of the heating element, so that the sealing medium contained therein is melted or becomes liquid. By application of positive pressure in the sealing medium reservoir, the sealing medium can act on the sealing element so that it displaces or deforms. By deformation or displacement of the sealing element, it reaches the closed position, wherein the actuator fluid supply connection is sealed in a fluid-tight or pressure-tight way. After the closed position has been reached, the heating element can be switched off, so that the sealing medium solidifies within the sealing medium reservoir and the sealing element is prevented from restoring to return to the open position.

Since the sealing element pressure-seals the actuator fluid supply connection in the closed position, the actuator element remains in its position as well, irrespective of whether this is the resting position or the actuation position.

In at least some embodiments, the actuator comprises a reservoir fluid supply, which is fluidly connected to the sealing medium reservoir by means of a reservoir fluid supply connection. By means of the reservoir fluid supply, positive pressure can be generated in the sealing medium reservoir. To this end, the reservoir fluid supply may be connected to a reservoir fluid source, which provides a reservoir fluid with the required positive pressure, so that the reservoir fluid can generate the positive pressure via the reservoir fluid supply connection in the sealing medium reservoir. Here, the reservoir fluid can directly or indirectly contact with the sealing medium contained in the sealing medium reservoir. In particular, the reservoir fluid supply connection may comprise a deformable wall, which is deformable by positive pressure in the reservoir fluid supply. The deformation of this wall in the reservoir fluid supply connection may be elastically and/or plastically. This deformable region of the wall may form at least partially the wall of the sealing medium reservoir, so that a deformation of the wall creates positive pressure in the sealing medium reservoir. The reservoir fluid supply can also be formed as a microfluidic channel with the corresponding dimensions. In particular, the reservoir fluid supply and the actuator fluid supply can be formed within one, preferably one and the same layer. This layer may be made of plastics, for example an elastomer or a polymer. In particular, the layer in which the microfluidic channels are formed is sufficiently rigid so as not to deform upon application of positive pressure in the reservoir fluid supply or actuator fluid supply.

Another aspect relates to an actuator assembly with at least two actuators, wherein the fluid supplies of the actuators are fluidly connected to each other. It is understood that also 3, 4, 5, 6, 7, 8 or more actuators can be combined to form one actuator assembly. In at least some embodiments, the actuators can be arranged in a rectangular arrangement in fields of two times two, three times three, two times three, . . . , n times m actuators, where n and m are arbitrary natural numbers. Further in at least some embodiments, the m actuators are arranged equidistantly along a direction x. Further in at least some embodiments, the n actuators are arranged equidistantly spaced along a direction y, in particular the directions x and y are perpendicular to each other. Advantageously, assemblies of an arbitrary number of actuators can be formed in an arbitrary manner, wherein the actuators can be jointly fed by a common actuator fluid source, since the actuator fluid supplies are fluidly connected with each other. Further in at least some embodiments, the actuators can each comprise a reservoir fluid supply, wherein the reservoir fluid supplies of the actuators are fluidly connected to each another and are in particular connected to a common reservoir fluid source. Further in at least some embodiments, the actuators of the actuator assembly are controlled by a single system controller. That is, the system controller controls the heating elements of the actuators as well as the actuator fluid source and optionally the reservoir fluid source.

Another aspect relates to a use of an actuator assembly as a haptic display device, wherein a plurality of tactile characters can be represented by means of the actuator elements of the actuator assembly. In particular, the actuators can be used to represent characters in Braille. For example, the actuators can be arranged in groups of three times two actuators, whereby a letter can be represented in Braille each. A plurality of such groups can be arranged to form one line. Further, several lines may be formed among themselves, so that a number of 40, 60, 80, 120, 200, 300, 400, 600, 960 or more characters can be displayed at the same time. In the actuation position, the actuators each from a punctiform protuberance of a surface of the display device with their actuator elements, said protuberance being touchable by a user. Advantageously, content can be represented by the bistable actuators in Braille in an energy-efficient way, since no more energy is required to maintain a typeface. Energy supply is only necessary if the typeface of the display device needs to be changed.

BRIEF DESCRIPTION OF THE DRAWINGS

In the following, exemplary embodiments will be explained by way of example with reference to the accompanying drawings, wherein individual features can be combined to form new embodiments separately from each other. The figures show.

DETAILED DESCRIPTION

Figure 1:
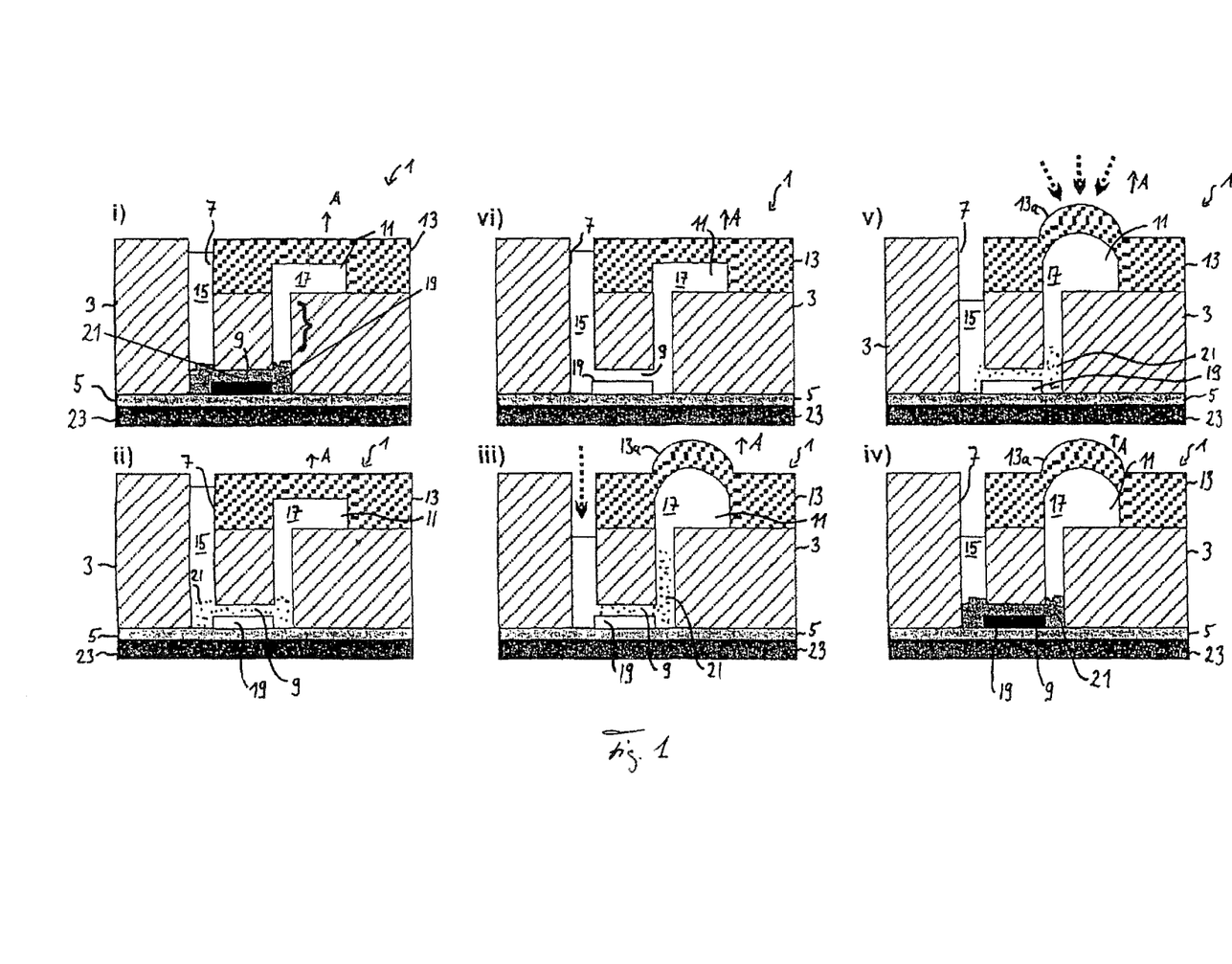
FIG. 1: sectional views of an exemplary embodiment of a bistable actuator in six different states i and vi.

FIG. 1 shows an actuator in six different states i to vi. FIG. 1i shows the actuator 1 in a resting state. The actuator 1 is designed as a microfluidic actuator that comprises a rigid volume body, or solid, 3 arranged on a planar substrate 5. An actuator fluid feed 7, an actuator fluid feed connection 9, and an actuator chamber 11 are formed in the solid 3 of the actuator. The wall of the actuator chamber 11 is partially formed by an elastomeric membrane 13, which is secured to the solid 3, for example by gluing or laminating.

The actuator fluid supply 7 and the actuator fluid supply connection 9 are formed as a microfluidic channel. In other words, the actuator fluid supply 7 and/or the actuator fluid supply connection 9 have a diameter of less than 1 mm, preferably less than 100 µm, and particularly a diameter of about 10 µm to about 50 µm. The volume of the actuator chamber 11 is accordingly in a range of about 0.01 mm$^3$ to about 2 mm$^3$. In a proper use of the actuator 1, the actuator fluid supply 7 is filled with an actuator fluid 15 and is fluidly connected to an actuator fluid source (not illustrated) in order to be able to provide positive pressure in the actuator fluid supply 7. In a proper use, the actuator chamber 11 is filled with an actuator fluid 17, which may be different from or identical with the actuator fluid 15 in the actuator fluid supply 7. Since in a proper use of the actuator 1, positive pressure can be applied in the actuator fluid supply 7, in the actuator fluid supply connection 9, and in the actuator chamber 11, the solid 3 of the actuator 1 is designed in such a mechanically rigid way that the solid 3 does substantially not deform mechanically when a positive pressure is applied. The solid 3 can be manufactured from a polymer, such as PVC, PE, PP, ABS, polycarbonate, and the like. In contrast, the elastomeric membrane 13 is formed to be elastically resiliently deformable. In other words, the elastomeric membrane 13 can be deformed by positive pressure applied in the actuator chamber 11. As the elastomeric membrane 13 is designed to be resilient, the elastomeric membrane 13 returns to its original shape or position when the positive pressure of the actuator chamber fluid 17 in the actuator chamber 11 is no longer applied. In other words, the solid 3 is formed to be more rigid than the elastomeric membrane 13. In particular, the solid 3 has a larger shear modulus, and/or modulus of elasticity than the elastomeric membrane 13.

A heating element 19 is arranged in the actuator fluid supply connection 9, which can be formed as an ohmic resistance or heating resistor 19. In particular, the heating element 19 can be formed as an SMD component, which can be electrically connected electrically to a circuit board 5 as a preferred planar substrate 5. Advantageously, the circuit board 5 can then serve both as a mechanical support of the solid 3 and as energy supply for the heating element 19.

The actuator fluid supply connection 9 is filled with a sealing medium 21. The sealing medium 21 can also fill parts of the actuator fluid supply 7. In the exemplary embodiment of the actuator 1 shown in FIG. 1, the sealing medium 21 contacts the heating element 19 directly. It is understood, however, that the sealing medium and the heating element 19 can be separated from each other by further elements, wherein the heating element 19 contacts the sealing medium 21 thermally. In other words, the sealing medium 21 can be heated by means of the heating element 19.

In the state shown in FIG. 1i, the sealing medium 21 is in a solid aggregation state, so that the actuator fluid supply connection 9 is pressure-sealed by the sealing medium 21. In other words, positive pressure in the actuator fluid 15 within the actuator fluid supply 7 does not effect the actuator chamber fluid 17 in the actuator chamber 11. Accordingly, the application of positive pressure in the actuator fluid supply 7 does not cause deformation of the elastomeric membrane 13.

Further, the actuator 1 includes a cooling element 23, which can be designed as a Peltier element, for example. In the exemplary embodiment of the actuator 1 shown in FIG. 1, the cooling element 23 contacts the sealing medium 21 only indirectly via the planar substrate 5. In other words, the thermal contact is established via the planar substrate 5. Thus, the sealing medium 21 can be cooled by means of the cooling element 23. In particular, cooling can be locally, wherein the sealing medium 21 is cooled or can be cooled exclusively within the actuator fluid supply connection 9 or in the region of the actuator fluid feed connection 9.

The actuator 1 may be operated at an ambient temperature of 20° C. to about 24° C. Since the actuator 1 does not have any further thermally active components except for the heating element 19 and cooling element 23, the temperature within the actuator, in particular within the actuator fluid supply connection 9, corresponds to the ambient temperature when the heating element 19 and cooling element 23 are deactivated. In at least some embodiments, the sealing medium 21 is selected such that it is in a solid aggregation state at a temperature corresponding to the ambient temperature (i.e. about 20° C. to 24° C.). Further, the heating element 19 is dimensioned such that the heating element 19 provides a heating power sufficient to heat the sealing medium 21 to a temperature above the melting point. An exemplary sealing medium 21 is paraffin, which depending on the molecular length of alkanes contained therein has a melting point of about 45° C. to about 80° C.

Expediently, the sealing medium 21 is chemically resistant with respect to the actuator fluid 15, in particular not soluble. For example, the sealing medium 21 can consist of one or more non-polar substance(s), while the actuator fluid 15 consists of one or more polar substance(s). When using paraffin as the sealing medium 21, water can serve as the actuator fluid 15, for example.

In at least some embodiments, the actuator fluid 15 and the sealing medium 21 can be identical. Particularly in the case that the sealing medium 21 is cooled to solidify, the actuator fluid 15 and the sealing medium 21 can consist of a single liquid (e.g. water), which is liquid without cooling and which solidifies when cooled.

In the resting state of the actuator 1 shown in FIG. 1i, the heating resistor 19 and the cooling element 23 are switched off and the sealing medium 21 is in a solid aggregation state, so that the actuator fluid supply connection 9 is sealed by the sealing medium in a fluid-tight or pressure-tight manner, and thus the actuator chamber 11 is fluidly separated from the actuator fluid supply 7. Since energy does not need to be supplied to the actuator 1 to attain the resting state, this resting state can be referred to as a first stable state.

If the heating element 19 is activated or switched on, the actuator 1 transitions to the state shown in FIG. 1ii, which is maintained as long as the heating element 19 is switched on. By the thermal energy dissipated by the heating element 19, the sealing medium 21 is heated to a temperature above the melting temperature, for example above 45° C. or above about 80° C., so that the sealing medium 21 transitions to the liquid aggregation state. Thereby, the actuator chamber 11 is no longer separated from the actuator fluid supply 7 by means of the sealing medium 21 in a pressure-tight way.

By applying positive pressure to the actuator fluid 15 in the actuator fluid supply 7, the actuator fluid 15 and the sealing medium 21 are displaced toward the actuator chamber 11.

By applying positive pressure in the actuator fluid supply 7 (see FIG. 1iii), positive pressure is applied in the actuator chamber 11 as well, which is now fluidly connected to the actuator fluid supply 7 via the actuator fluid supply connection 9. By the positive pressure in the actuator chamber 11, the elastomeric membrane 13 is deformed or at least partially displaced along an actuation direction A. The pressure in the actuator fluid supply 7 can be applied by means of an unillustrated actuator fluid source, for example. Alternatively, the actuator fluid 15 contained in the actuator fluid supply 7 can be subjected to positive pressure by means of another fluid as well. For example, an incompressible actuator fluid 15 can be filled into the actuator fluid supply 7, such as a liquid, e.g. water or aliphatic hydrocarbons. Basically all liquids having melting points slightly below the operating range of the actuator (for example about 0° C.) can be used as the actuator fluid 15. Incompressible liquids are advantageously volume-invariant, so that the positive pressure acting in the actuator fluid supply 7 does not effect a change in the actuator fluid volume, whereby loss of effectiveness due to the compression of the actuator fluid is advantageously avoided. For example, positive pressure can be applied pneumatically to the actuator fluid 15 in the actuator fluid supply 7. In particular, a source of compressed air (not illustrated) can be fluidly connected to the actuator fluid supply 7, so that positive pressure is applied to the actuator fluid 15 contained in the actuator fluid supply 7 by means of the compressed air. The positive pressure required to actuate the elastomeric membrane 13 as an exemplary embodiment of an actuator element can be about 1 bar to about 4 bar, more preferably the positive pressure can be about 2 bar to about 3 bar.

After the actuator element or the elastomeric membrane 13 has been deformed along the actuation direction A, the heating element 19 is switched off (see FIG. 1iv), so that the sealing medium 21 is not heated anymore. In addition, the sealing medium 21 can be cooled by means of the cooling element 23. If the sealing medium 21 has cooled below the melting point, the sealing medium 21 is in the solid aggregation state again. Here, the actuator fluid supply connection 9 is pressure-sealed again. After solidification of the sealing medium 21 or sealing of the actuator fluid supply connection 9, further cooling by means of the cooling element 23 is not required anymore.

Alternatively, the cooling element 23 can be operated continuously, wherein the heating element 19 is only switched on to melt the sealing medium 21. This alternative mode of operation is expediently carried out in the case that the sealing medium 21 has a melting point below the operating temperature of the actuator 1, for example if water is used as the sealing medium 21.

The actuation state of the actuator 1 shown in FIG. 1iv is attained, in which the actuator element or elastomeric membrane 13 remains deformed or displaced in the actuation position due to the positive pressure of the actuator chamber fluid 17 maintained in the actuator chamber 11. Since the positive pressure of the actuator chamber fluid 17 in the actuator chamber 11 is independent of the pressure conditions in the actuator fluid supply 7 due to the pressure-tight sealing of the actuator fluid supply connection 9 by means of the sealing medium 21, the positive pressure applied to the actuator fluid supply 7 can be released again. The actuation state can therefore also be referred to as the second stable state.

Activation of the heating element 19 results in a melting of the sealing medium 21 in the actuator fluid supply connection 9, so that the positive pressure in the actuator chamber 11 can escape to a position further remote from the actuator chamber 11 by a displacement of the sealing medium 21 when no positive pressure is applied in the actuator fluid supply 7 (see FIG. 1v). Specifically, the pressure in the actuator fluid supply 7 may correspond to the ambient pressure of the actuator 1, which also acts on the outer side 13a of the elastomeric membrane 13 opposite to the actuation direction A. The restoring force of the resiliently elastically deformable elastomeric membrane 13 then provides for a restoring of the elastomeric membrane and for a displacement of the sealing medium 21, as shown in FIG. 1vi. As soon as the elastomeric membrane 13 has returned to its initial position, the heating element 19 can be deactivated, so that the sealing medium 21 solidifies again and seals the actuator fluid supply connection 9 in a pressure-tight manner, so that the actuator 1 returns to the resting position, as shown in FIG. 1i. Since the actuator 1, as shown in FIG. 1, has exactly two stable states, namely the resting state (see FIG. 1i) and the actuation state (see FIG. 1iv), the actuator 1 can be also referred to as a bistable actuator 1.

In other words, the bistable actuator shown in FIG. 1 can perform a method for the bistable actuation, including the steps of:

liquefying the sealing medium 21, which is disposed in the actuator fluid supply connection 9 between an actuator chamber 11 and an actuator fluid supply 7 and which separates the actuator chamber 11 from the actuator fluid supply 7 fluidly;

applying a fluid positive pressure in the actuator fluid supply 7, wherein the melted sealing medium 21 is at least partially displaced toward the actuator chamber 11, and wherein a working pressure is generated in the actuator chamber 11, whereby an actuator element 13 fluidly connected to the actuator chamber 11 is brought from a resting position to an actuation position;

solidifying the sealing medium 21, wherein the actuator fluid supply connection 9 is sealed in a pressure-tight manner, so that the working pressure in the actuator chamber 11 is obtained and the actuator element 13 remains in the actuation position.

After these steps, the actuator is in a stable actuation state that does not require any further supply of energy. In at least some embodiments, the method may include one or more of the following further steps:

releasing the positive pressure or applying negative pressure in the actuator fluid supply 7;

liquefying the sealing medium 21 in the actuator fluid supply connection 9, wherein the working pressure in the actuator chamber 11 decreases and the actuator element 13 returns from the actuation position to the resting position.

solidifying the sealing medium 21, wherein the actuator 1 transitions to its initial resting state.

The actuator 1 shown in FIG. 1 includes an actuator fluid feed connection 9 having a diameter or a gap width of about 10 μm to about 1 mm, whereby only a small volume of sealing medium 21 is necessary to seal the actuator fluid supply connection 9. Thereby, the actuator 1 advantageously exhibits improved actuator dynamics, since the time for melting the small volume of sealing medium 21 is correspondingly small. The switching times of the actuator 1 from the resting state to the actuation state can therefore be in the range from about 0.1 sec to about 1 sec.

Since it is only required to heat the sealing medium 21 in the region of the actuator fluid supply connection 9 such that the sealing medium 21 transitions to the liquid aggregation state, the heating zone for the heating element 19 remains limited to the region of the actuator fluid supply connection 9. In particular, the heating element 19 can form a wall of the actuator fluid supply connection 9. Thereby, the contact surface of the heating element 19 with the sealing medium 21 in proportion to the volume of the sealing medium 21 can be so favorable that melting of the sealing medium 21 in the entire volume of the actuator fluid supply connection 9 can take place preferably in a period of less than 1 sec. In at least some embodiments, the heating element 19 may be formed as an SMD component (surface mounted device), whereby the heating element 19 can in particular be secured on a circuit board 5 as a preferred planar substrate 5 and be contacted electrically in a simple manner.

Further advantageously, the actuator 1 allows spatial decoupling and thus effective thermal separation between the (thermally modulated) actuator fluid supply connection 9 and the actuator chamber 11 or the actuator element 13, which may be formed as the elastomeric membrane 13, that is, the location where the actuating member 13 is displaced along the actuation direction A (at the location at which an actuator stroke occurs). Since the actuator fluid 15 may be an incompressible liquid, the actuator stroke can be transmitted almost unlimitedly in a hydraulic fashion. In other words, the fluidic connection between the actuator chamber 11 and the actuator fluid supply connection 9 may be longer than a few millimeters, in particular greater than 1 cm, preferably greater than 5 cm, whereby the formation of the actuator can be variable.

In an exemplary embodiment of the actuator shown in FIG. 1, the actuator 1 comprises, in addition to the heating element, a heat sink or a cooling element 23, which can be embodied e.g. in form of a heat pipe or a Peltier element. The cooling element 23 can operate permanently. This is particularly advantageous because it is technically easier to generate heat locally than to dissipate heat locally. The heating element 19 can be switched on and off in a time-controlled manner to overcompensate the cooling element 23. The generation of heat advantageously takes place very quickly, that is, preferably faster than about 100 milliseconds, preferably faster than about 50 milliseconds and in particular faster than about 10 milliseconds, for example in the case of an ohmic resistance as a preferred embodiment of a heating element 19. Since the dissipation of heat may be performed continuously, the actuator 1 exhibits similarly good actuator dynamics after switching-off of the heating element 19 than it does during heating. Further, a common cooling element 23 can be provided in an assembly of several actuators 1, which serves as a common heat sink for a plurality of heating elements 19.

Further advantageously, the actuator 1 shown in FIG. 1 has a simple construction. It includes a solid volume body, or solid, 3, a planar substrate 5 having heating elements 19 arranged or secured thereon and contacted electrically, and an elastomeric membrane 13 applied on the solid 3. Therefore, advantageously only two connection steps are needed to produce an actuator according to FIG. 1. In particular, the connections between the solid 3 and the elastomeric membrane 13 or the solid 3 and the planar substrate 5 are formed in a flat fashion or with the effect of a surface. In other words, the elastomeric membrane 13 can be connected to the solid 3 by gluing or laminating. Further, the solid 3 can be connected to the planar substrate 5 by gluing or laminating.

Further advantageously, the actuator 1 shown in FIG. 1 is bistable in the classic sense: The resting state of the actuator, in which the actuator element is in a resting position, and the actuation state, in which the actuator element is deflected along the actuation direction A and is in an actuation position, are stabilized by the phase transition of the sealing medium. In other words, the solid aggregate state of the sealing medium 21 has the effect that the state of the actuator 1 does not change anymore without energy being supplied to the actuator 1, which e.g. brings the sealing medium 21 to the liquid aggregation state by means of the heating element 19. In contrast, the actuator fluid 15 must always be liquid at the temperatures occurring during the intended use of the actuator 1 in the actuator fluid supply 7. Therefore, paraffins, which typically have a melting point of greater than 40° C., are not suitable as the actuator fluid 15. Incompressible liquids may be used as the actuator fluid 15, for example water or aliphatic hydrocarbons, with melting points below the temperature of the actuator 1 during the intended use (for example 0° C.).

Figure 2:
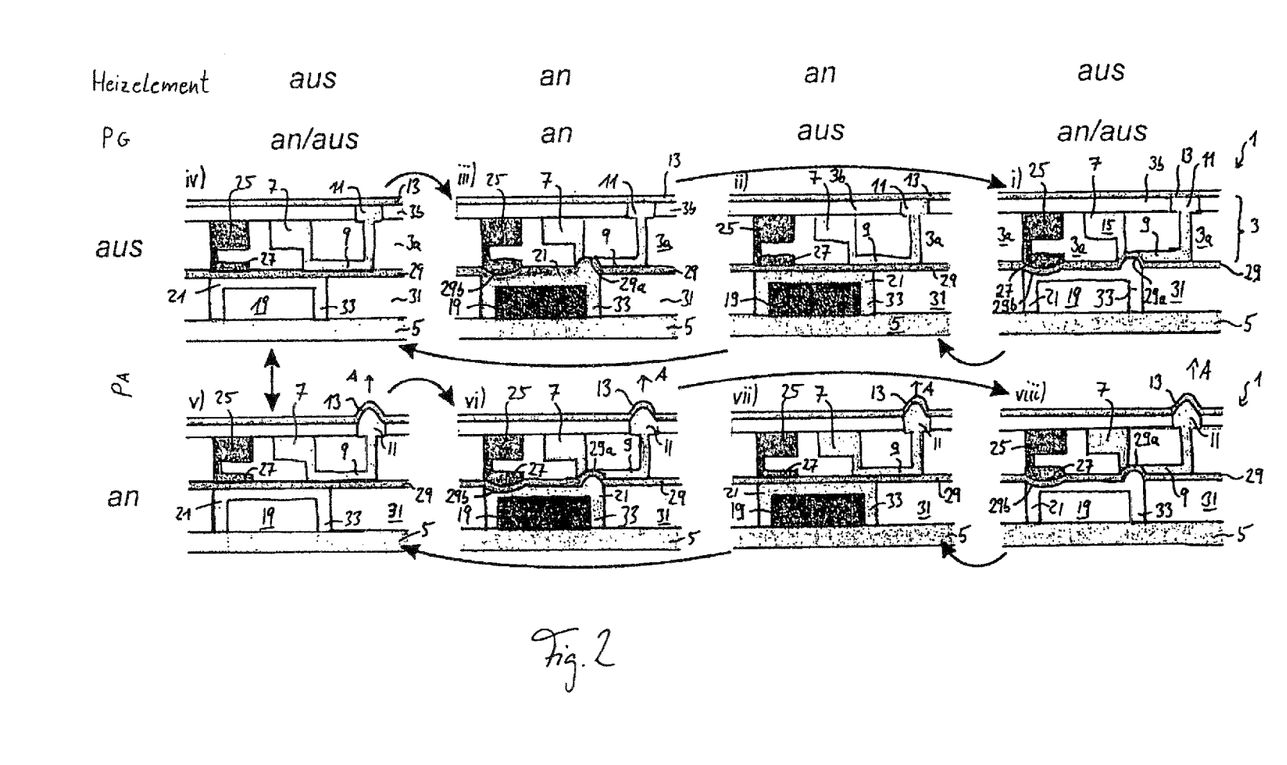
FIG. 2: sectional views of a further exemplary embodiment of a bistable actuator in eight different states i to viii.

FIG. 2 shows sectional views of a further exemplary embodiment of a bistable actuator 1 in eight different states i to viii. The configuration of the actuator 1 in FIG. 2 corresponds to the configuration of the actuator shown in FIG. 1 in many respects. Identical components are therefore provided with identical reference numerals.

The actuator 1 includes a volume body, or solid, 3 composed of two layers 3a and 3b, which are connected or glued together, for example by laminating. In the solid 3, an actuator fluid feed 7 and an actuator fluid supply connection 9 are formed within a first layer 3a of the volume of body 3. The second layer 3b of the solid 3 forms at least partially an actuator chamber 11, which is fluidly connected to the actuator fluid supply connection 9. An elastomeric membrane 13 is secured on the second layer 3b of the solid 3, wherein the elastomeric membrane 13 forms at least a wall of the actuator chamber 11. Further, a reservoir fluid supply 25 and a reservoir fluid supply connection 27 are formed in the first layer 3a of the solid 3, which are not fluidly connected to the actuator fluid supply 7 or are separated from it.

A second elastomeric membrane 29, which forms at least partially a wall of the actuator fluid supply connection 9 and the reservoir fluid supply connection 27, is arranged or secured on the first layer 3a of the solid 3. In particular, the second elastomeric membrane 29 is elastically resiliently formed in the region forming the wall of the actuator fluid supply connection 9, so that the second elastomeric membrane 29 functions as a sealing element 29a in this region. Further, the second elastomeric membrane 29 is formed in a deformable fashion in the region forming the wall of the reservoir fluid supply connection 27, so that this region of the second elastomeric membrane 29 can serve as a pressure transmission element 29b. Specifically, the pressure transmission element 29b is deformable by applying positive pressure in the reservoir fluid supply connection 27 to the pressure transmission element 29b by means of the reservoir fluid supply 25, said element thereby deforming. At the side of the second elastomeric membrane 29 opposite to the solid 3 a second volume body, or solid, 31 is arranged or secured on the second elastomeric membrane 29. In the second solid 31, a sealing medium reservoir 33 containing a sealing medium 21 is formed. The sealing medium reservoir 33 is fluidly connected to the sealing element 29a and the pressure transmission element 29b. This can be realized by the sealing element 29a and/or the pressure transmission element 29b at least partially forming the wall of the sealing medium reservoir 33.

Further, a heating element 19 adapted to heat the sealing medium 21 within the sealing medium reservoir 33 to bring it from a solid state to a liquid state can be arranged in the sealing medium reservoir 33. An exemplary sealing medium 21 is paraffin, as described already with respect to FIG. 1. In the embodiment shown in FIG. 2, a planar substrate 5 is arranged or secured on the second solid 31, wherein the planar substrate 5 is formed as a circuit board 5 in one embodiment thereof, said circuit board carrying the heating element 19 and contacting same electrically.

The operation mode of the embodiment of the actuator 1 shown in FIG. 2 substantially corresponds to the operation mode of the actuator shown in FIG. 1, wherein the sealing device of the actuator 1 shown in FIG. 2 comprises a bistable actuator filled with the sealing medium 21.

In the resting state of the actuator 1 shown in FIG. 2i, the actuator element 13, which is designed as an elastically and resiliently deformable elastomeric membrane 13, is in a resting position. The actuator fluid supply connection 9 is sealed in a fluid-tight and pressure-tight manner by a deformed region of the second elastomeric membrane 29, so that the actuator chamber 11 is fluidly separated from the actuator fluid supply 7. The deformed region of the second elastomeric membrane thus acts as the sealing element 29a. The sealing element 29a may be kept in position by a solidified sealing medium 21, which is disposed in the sealing medium reservoir 33. It is therefore not relevant to the position of the sealing element 29a whether positive pressure is applied in the reservoir fluid supply 25. Thus, the actuator 1 is in a stable condition.

By activation of the heating element 19, the sealing medium 21 in the sealing medium reservoir 33 is melted or liquefied, so that the resiliently formed sealing element 29a can return to its original shape or position when there is no positive pressure in the reservoir fluid supply 25. Thereby, the actuator transitions to the state shown in FIG. 2ii, in which the actuator chamber 11 is fluidly connected to the actuator fluid supply 7 via the actuator fluid supply connection 9.

The heating element 19 can now be deactivated again, as shown in FIG. 2iv in that the heating element 19 is not shown as filled anymore.

By application of positive pressure in the actuator fluid supply 7, a working positive pressure can be applied in the actuator chamber 11, whereby the actuator element 13 deforms or displaces linearly along an actuation direction A. The current element 13 is thus brought to the actuation position, as shown in FIG. 2v.

By activation of the heating element 19, the sealing medium 21 can be melted or kept liquid in the sealing medium reservoir 33, so that by application of positive pressure in the reservoir fluid supply 25, which can exert the positive pressure to the sealing medium reservoir 33 with the reservoir fluid supply connection 27, the liquid sealing medium 21 is subjected to positive pressure such that the elastic deformable sealing element 29a is deformed so as to seal the actuator fluid supply connection 9. This state is shown in FIG. 2vi.

After deactivation of the heating element 19, the sealing medium 21 solidifies in the sealing medium reservoir 33, so that the sealing element 29a is stably held in the closed position, as shown in FIG. 2viii. This state, which can be referred to as the actuation state of the actuator 1, is stable without any further supply of energy.

In order to bring the actuator 1 from the actuation state back to the resting state, the heating element 19 can be activated, wherein no positive pressure is applied in the fluid supply reservoir 25 at the same time, as shown in FIG. 2vii. Thereby, the sealing element 29a returns to an open position, in which the actuator fluid supply connection 9 is opened between the actuator chamber 11 and the actuator fluid supply 7.

The heating element 19 can be deactivated in this phase, as shown in FIG. 2v.

If no positive pressure is applied in the actuator fluid supply 7 or if there is negative pressure in the actuator fluid supply 7 with respect to the ambient pressure of the actuator 1, the actuator element 13 is displaced opposite to the actuation direction A or the current element 13 returns to its original position due to its resiliency, as shown in FIG. 2iv.

To keep the actuator element 13 stable in the resting position, again, the heating element 19 can be activated to keep the sealing medium 21 in the sealing medium reservoir 33 liquid or melt it, wherein positive pressure is applied in the reservoir fluid supply 25 to bring the sealing element 29a into a closed position, as described above, in which the actuator fluid supply connection 9 is sealed in a fluid-tight and pressure-tight manner. This state is shown in FIG. 2iii.

After deactivation of the heating element 19 and solidification of the sealing medium 21, the sealing element 29a is held stably in the closed position, so that the actuator 1 returns to the resting state shown in FIG. 2i.

The actuators described above with reference to FIGS. 1 and 2 are designed in a bistable and binary manner. In other words, the actuator element 13 may be in two different states, namely in the resting position and in the actuation position. Here, the actuator 1 can be brought into a stable state in which the actuator element is kept in the resting position or in the actuation position without any further supply of energy. Furthermore, the actuators described above are advantageously highly integrable in this way. In particular, it is constructively simple to introduce a plurality of such actuators into a solid volume body, or solid, such as a polymer component. This can be done advantageously by simple and inexpensive manufacturing methods, for example by injection molding.

In a next step for producing an actuator or an actuator assembly, a circuit board can be arranged or secured on a side of the polymer component or the solid 3. In particular, each actuator 1 can be assigned an individually addressable heating resistor 19. The actuator chambers 11, the actuator fluid feed connection 9, and at least partially the actuator fluid supply 7 can then be filled with a fluid, for example water. For better handling, this assembly can be frozen in this state, for example in a freezer, before a plane and structured elastomeric membrane 13 is applied or secured as an exemplary actuator element 13 in a flat fashion, wherein the elastomeric membrane 13 seals the actuator chambers 11.

By means of this manufacturing process, it is possible to simultaneously produce a plurality of actuators 1 in an actuator assembly. In particular, several dozens or hundreds of such actuators can be produced simultaneously in an actuator assembly. Advantageously, no adjustment of actively moved mechanical components is necessary, and except for a rough alignment, which ensures that the heating elements 19 are arranged relative to the actuator fluid supply connection 9 or the sealing medium reservoirs 33, no exact positioning of further components is required in the production of the actuator assembly.

Further advantageously, the illustrated embodiments are well scalable. To this end, a plurality of the actuators 1 can be highly integrated in terms of construction, for example about 500 actuators in close proximity. They can be controlled via a circuit board with accordingly about one hundred individually addressable heating elements 19, wherein each actuator 19 is assigned an individually addressable heating element 19. A common heat sink can be attached to or arranged on the circuit board, for example in the form of a Peltier element that is electrically switchable. Now, if the individual actuator fluid supplies are constructively operated with an actuator fluid via a common fluid source or a common fluid reservoir, a simple scalable operating principle is made possible. Here, the common fluid reservoir is periodically loaded with positive pressure (for example 3 bar), kept for a few seconds and then reduced to ambient pressure again. Synchronous with this pressure application and release, the individual heating elements 19 can be switched on and off. The use of this parallel pressure application in conjunction with the use of a phase transfer or aggregate state transition in an actuator fluid feed connection, which may be formed as a thin gap or thin channel, show that a simple robust binary and stable, highly integrable and virtually unlimitedly scalable actuator assembly can be manufactured.

Here, the actuator has high dynamics since, due to the small volume in the actuator fluid supply connection 9, the volume of sealing medium 21 to be melted or solidified is very small, for example less than 1 mm$^3$, and in particular less than 0.1 mm$^3$. Thereby, advantageously an almost punctiform heat source in the form of a heating element 19 can be used in order to perform melting of the sealing medium 21. Further, such a heating element can be formed as an SMD resistor in a cheap and simple way, which SMD resistor can be contacted to the circuit board in a simple way.

However, an arbitrary actuator stroke of the actuator element 13 may occur, as the strength of the actuator stroke is independent of the quantity of sealing medium. Rather, an actuator fluid may be provided with arbitrary pressure and volume in order to provide an arbitrary actuator stroke of the actuator element 13 or an arbitrary actuation force of the actuator element 13. Furthermore, it is advantageously possible to perform a parallel operation of several actuator elements 13 with a single external pressure source, which provides an actuator fluid 15.

Further advantageously, an actuator assembly can be set up and produced in a simple manner, since the individual components can be produced separately and can be connected with each other in a flat or surface-like fashion by bonding or laminating. In particular, the sealing medium can be filled in easily in this way. In the production process, the sealing medium may be disposed into the associated recess of the corresponding component of the actuator assembly as solid matter or in liquid form.

Further advantageously, the heating elements 19 can be arbitrarily spaced from the actuator element 13, wherein in particular the sealing medium 21 does not contact the current element. Thereby, it is constructively possible to provide a simple and efficient removal of heat for the sealing medium 21, whereby it can solidify in a shorter period of time.

Figure 3:
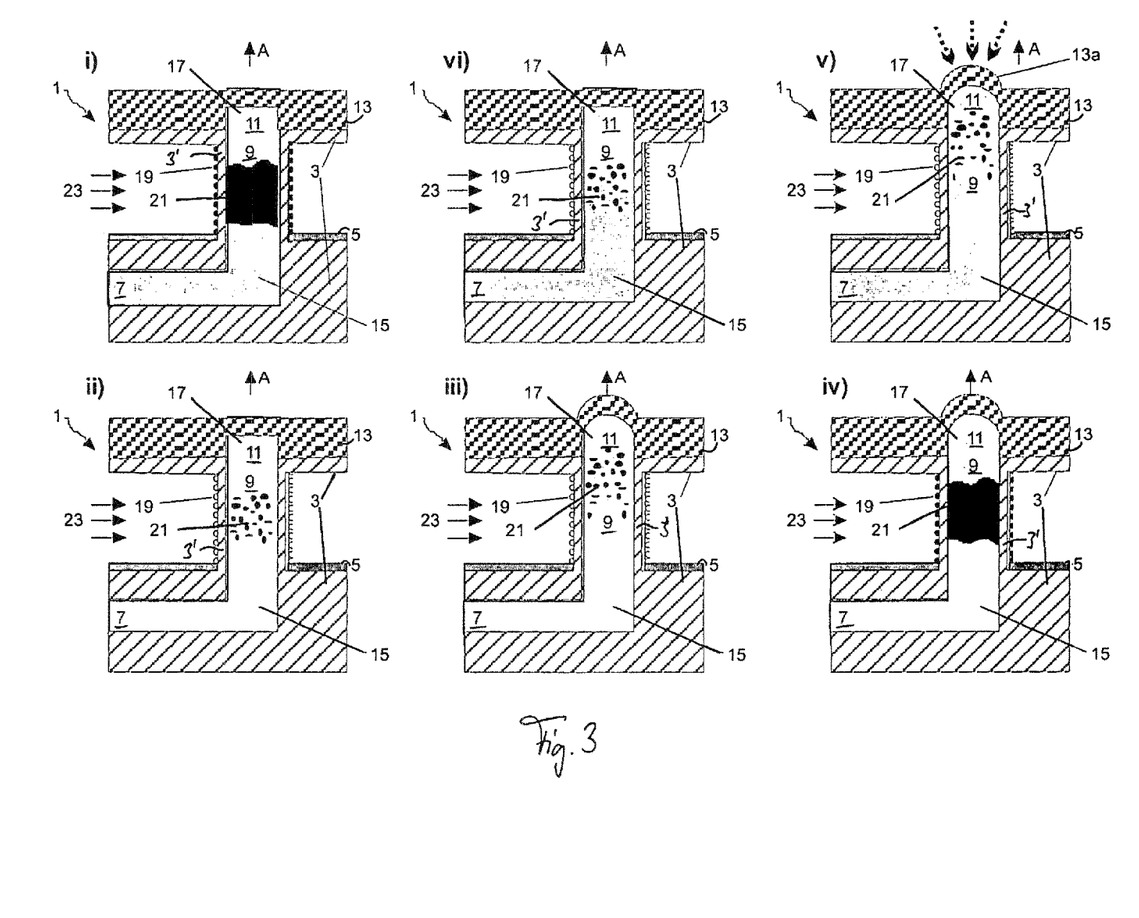
FIG. 3: sectional views of a further exemplary embodiment of a bistable actuator in six different states i and vi.

FIGS. 3i to 3Vi show another exemplary embodiment of the actuator in six different states i to vi. FIG. 3i shows the actuator 1 in a resting state. The actuator 1 is designed as a microfluidic actuator, which comprises a substantially rigid volume body, or solid, 3, on which a planar substrate 5 is arranged. The solid 3 includes a protuberance 3', which extends through an opening 5' of the planar substrate. An actuator fluid supply 7, an actuator fluid supply connection 9, and an actuator chamber 11 are formed in the solid 3 of the actuator 1. The actuator fluid supply connection 9 and the actuator chamber 11 can together be arranged within a cavity arranged in the protuberance 3'. In particular, the actuator fluid supply connection 9 and the actuator chamber 11 can form a common cylindrical cavity. For example, the protuberance 3' of the solid 3 can be substantially tubular at least in parts, wherein the actuator fluid supply connection 9 and/or the actuator chamber 11 is arranged in the tubular portion region.

The wall of the actuator chamber 11 is formed by an elastomeric membrane 13 in parts, which is secured to the solid 3 and its protuberance 3', for example by gluing or laminating. In particular, the elastomeric membrane can have a recess, which at least partially forms the actuator chamber 11.

The actuator fluid supply 7 and/or the actuator fluid supply connection 9 and/or the actuator chamber 11 is/are formed as microfluidic channels. In other words, the actuator fluid supply 7 and/or the actuator fluid supply connection 9 and/or the actuation chamber 11 have a diameter of less than 1 mm, preferably less than 100 µm, and in particular a diameter of about 10 µm to about 50 µm.

The volume of the actuator chamber 11 is therefore in a range of about 0.01 mm$^3$ to about 2 mm$^3$. In the intended use of the actuator 1, the actuator fluid supply 7 is filled with an actuator fluid 15 and fluidly connected to an actuator fluid source (not illustrated) in order to be able to provide positive pressure in the actuator fluid supply 7. In the intended use, the actuator chamber 11 is filled with an actuator chamber fluid 17, which may be different from or identical with the actuator fluid 15 in the actuator fluid supply 7. Since in the intended use of the actuator 1 positive pressure may be applied in the actuator fluid supply 7, in the actuator fluid supply connection 9, and in the actuator chamber 11, the solid 3 or the protuberance 3' of the actuator 1 is designed in such a mechanically rigid manner that the solid 3 or the protuberance 3' do substantially not deform mechanically when positive pressure is applied.

The solid 3 can be manufactured for example from a polymer, such as PVC, PE, PP, ABS, polycarbonate, and the like. In contrast, the elastomeric membrane 13 is designed in an elastically resiliently way. In other words, the elastomeric membrane 13 can be deformed by positive pressure applied in the actuator chamber 11. As the elastomeric membrane 13 is designed to be resilient, the elastomeric membrane 13 returns to its original shape or position when the positive pressure of the actuator chamber fluid 17 in the actuator chamber 11 is not applied anymore. In other words, the solid 3 is formed to be more rigid than the elastomeric membrane 13. In particular, the solid 3 has a greater shear modulus, and/or modulus of elasticity than the elastomeric membrane 13.

A heating element 19 is arranged in the region of the actuator fluid supply connection 9, which can be formed as an ohmic resistance or heating resistor 19. In particular, the heating element 19 can be formed as a heating wire wound, in particular helically, externally around the wall of the actuator fluid supply connection 9 or around the wall formed by the protuberance 3'. The heating element 19 can be electrically connected to a circuit board 5 as the preferred planar substrate 5. Advantageously, the circuit board 5 can then serve both as a mechanical support of the solid 3 and as an energy supply for the heating element 19.

The actuator fluid supply connection 9 is filled with a sealing medium 21. The sealing medium 21 can also fill parts of the actuator fluid supply 7. In the exemplary embodiment of the actuator 1 shown in FIG. 3, the sealing medium 21 contacts the heating element 19 indirectly via the wall of the actuator fluid supply connection 9 or the protuberance 3' of the heating element 19. It is understood, however, that the sealing medium 21 and the heating element 19 can be separated from each other by further elements, wherein the heating element 19 contacts the sealing medium 21 thermally, or the heating element 19 is arranged within the actuator fluid supply connection 9, so that the heating element 19 and the sealing medium contact each other directly (see FIG. 4). In other words, the sealing medium 21 can be heated by means of the heating element 19.

In the state shown in FIG. 3i, the sealing medium 21 is in a solid aggregation state, so that the actuator fluid supply connection 9 is pressure-sealed by the sealing medium 21. In other words, positive pressure in the actuator fluid 15 within the actuator fluid supply 7 does not effect the actuator chamber fluid 17 in the actuator chamber 11. Accordingly, the application of positive pressure in the actuator fluid supply 7 does not cause deformation of the elastomeric membrane 13.

Further, the actuator 1 comprises a cooling element 23, which can be designed as a Peltier element, for example. Here, the cooling element 23 can contact the heating element 19 and/or the planar substrate 5 directly or indirectly. For example, the cooling element 23 can be designed as a fluid channel through which a fluid, which is relatively cold in comparison to the actuator fluid 7 or to the sealing medium 21, can be fed to the heating element 19 or to the actuator fluid supply connection 9 in order to cool the sealing medium 21.

The actuator 1 may be operated at an ambient temperature of 20° C. to about 24° C. Since the actuator 1 does not have any further thermally active components except for the heating element 19 and cooling element 23, the temperature within the actuator, in particular within the actuator fluid supply connection 9, corresponds to the ambient temperature when the heating element 19 and cooling element 23 are deactivated. In at least some embodiments, the sealing medium 21 is selected such that it is in a solid aggregation state at a temperature corresponding to the ambient temperature (i.e. about 20° C. to 24° C.). Further, the heating element 19 is dimensioned such that the heating element 19 provides a heating power sufficient to heat the sealing medium 21 to a temperature above the melting point. An exemplary sealing medium 21 is paraffin, which depending on the molecular length of alkanes contained therein has a melting point of about 45° C. to about 80° C.

In the resting state of the actuator 1 shown in FIG. 3i, the heating resistor 19 and the cooling element 23 are switched off and the sealing medium 21 is in a solid aggregation state, so that the actuator fluid supply connection 9 is sealed by the sealing medium in a fluid-tight or pressure-tight manner, and thus the actuator chamber 11 is fluidly separated from the actuator fluid supply 7. Since energy does not need to be supplied to the actuator 1 to attain the resting state, this resting state can be referred to as a first stable state.

If the heating element 19 is activated or switched on, the actuator 1 transitions to the state shown in FIG. 3ii, which is maintained as long as the heating element 19 is switched on. By the thermal energy dissipated by the heating element 19, the sealing medium 21 is heated to a temperature above the melting temperature, for example above 45° C. or above about 80° C., so that the sealing medium 21 transitions to the liquid aggregation state. Thereby, the actuator chamber 11 is no longer separated from the actuator fluid supply 7 by means of the sealing medium 21 in a pressure-tight way.

By applying positive pressure to the actuator fluid 15 in the actuator fluid supply 7, the actuator fluid 15 and the sealing medium 21 are displaced toward the actuator chamber 11. The sealing medium 21 may have the same density as the surrounding actuator fluid 7 or the actuator chamber fluid 17 to prevent a gravity-induced sinking of the sealing medium 21 or a rise into the actuator chamber 11.

By applying positive pressure in the actuator fluid supply 7, positive pressure is applied in the actuator chamber 11 as well, which is now fluidly connected to the actuator fluid supply 7 via the actuator fluid supply connection 9. By the positive pressure in the actuator chamber 11, the elastomeric membrane 13 is deformed or at least partially displaced along an actuation direction A. The pressure in the actuator fluid supply 7 can be applied by means of an unillustrated actuator fluid source, for example. Alternatively, the actuator fluid 5 contained in the actuator fluid supply 7 can be subjected to positive pressure by means of another fluid as well. For example, an incompressible actuator fluid 15 can be filled into the actuator fluid supply 7, such as a liquid, e.g. water or aliphatic hydrocarbons. Basically all liquids having melting points slightly below the operating range of the actuator (for example about 0° C.) can be used as the actuator fluid 15. Incompressible liquids are advantageously volume-invariant, so that the positive pressure acting in the actuator fluid supply 7 does not effect a change in the actuator fluid volume, whereby loss of effectiveness due to the compression of the actuator fluid is advantageously avoided. For example, positive pressure can be applied pneumatically to the actuator fluid 15 in the actuator fluid supply 7. In particular, a source of compressed air (not illustrated) can be fluidly connected to the actuator fluid supply 7, so that positive pressure is applied to the actuator fluid 15 contained in the actuator fluid supply 7 by means of the compressed air. The positive pressure required to actuate the elastomeric membrane 13 as an exemplary embodiment of an actuator element can be about 1 bar to about 4 bar, more preferably the positive pressure can be about 2 bar to about 3 bar.

After the actuator element or the elastomeric membrane 13 has been deformed along the actuation direction A, the heating element 19 is switched off, as shown in FIG. 3iii, so that the sealing medium 21 is not heated anymore. In addition, the sealing medium 21 can be cooled by means of the cooling element 23. If the sealing medium 21 has cooled below the melting point, the sealing medium 21 is in the solid aggregation state again. Here, the actuator fluid supply connection 9 is pressure-sealed again. After solidification of the sealing medium 21 or sealing of the actuator fluid supply connection 9, further cooling by means of the cooling element 23 is not required anymore.

The actuation state of the actuator 1 shown in FIG. 3iv is attained, in which the actuator element or elastomeric membrane 13 remains deformed or displaced in the actuation position due to the positive pressure of the actuator chamber fluid 17 maintained in the actuator chamber 11. Since the positive pressure of the actuator chamber fluid 17 in the actuator chamber 11 is independent of the pressure conditions in the actuator fluid supply 7 due to the pressure-tight sealing of the actuator fluid supply connection 9 by means of the sealing medium 21, the positive pressure applied to the actuator fluid supply 7 can be released again. The actuation state can therefore also be referred to as the second stable state.

Activation of the heating element 19 (see FIG. 3v) results in a melting of the sealing medium 21 in the actuator fluid supply connection 9, so that the positive pressure in the actuator chamber 11 can escape to a position further remote from the actuator chamber 11 by a displacement of the sealing medium 21 when no positive pressure is applied in the actuator fluid supply 7. Specifically, the pressure in the actuator fluid supply 7 may correspond to the ambient pressure of the actuator 1, which also acts on the outer side 13a of the elastomeric membrane 13 opposite to the actuation direction A. The restoring force of the resiliently elastically deformable elastomeric membrane 13 then provides for a restoring of the elastomeric membrane and for a displacement of the sealing medium 21, as shown in FIG. 3vi. As soon as the elastomeric membrane 13 has returned to its initial position, the heating element 19 can be deactivated, so that the sealing medium 21 solidifies again and seals the actuator fluid supply connection 9 in a pressure-tight manner, so that the actuator 1 returns to the resting position, as shown in FIG. 3i. Since the actuator 1, as shown in FIG. 3, has exactly two stable states, namely the resting state and the actuation state, the actuator 1 can be also referred to as a bistable actuator 1.

In other words, the bistable actuator shown in FIG. 3 can perform a method similar to the method described with respect to FIG. 1.

Figure 4:
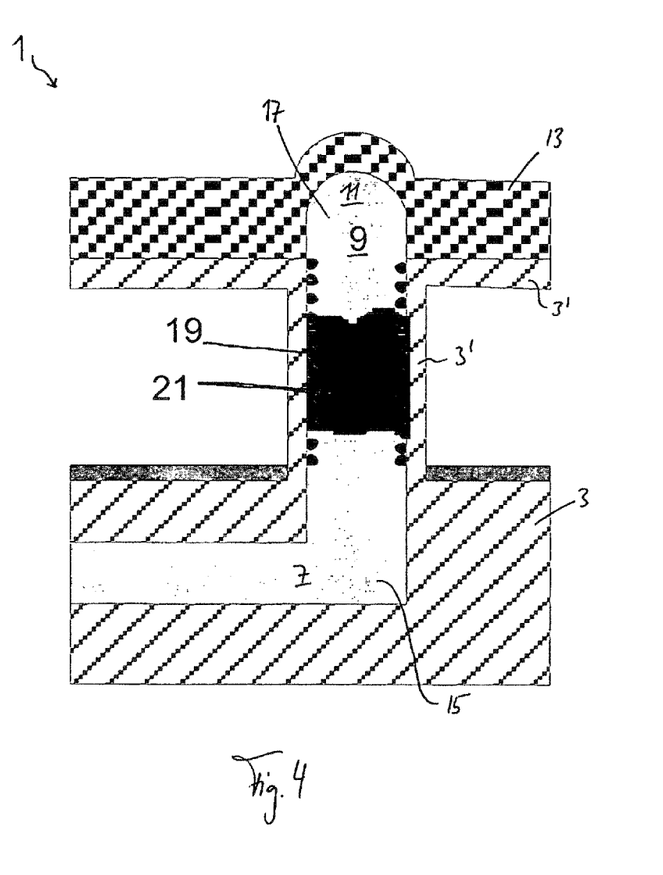
FIG. 4: another exemplary embodiment of the actuator.

FIG. 4 shows a further exemplary embodiment of the actuator. This embodiment corresponds substantially to the embodiment shown in FIGS. 3i to 3vi, wherein identical components are designated with identical reference numerals and the description of figures to 3i to 3vi also applies to the embodiment shown in FIG. 4. The embodiment of the actuator 1 shown in FIG. 4 comprises a heating element 19, which is arranged on the inner wall of the actuator fluid supply connection 9 or the protuberance 3' and contacts the sealing medium 21 directly. In particular, the heating element 19 can be formed as a helically wound heating wire.

Figure 5:
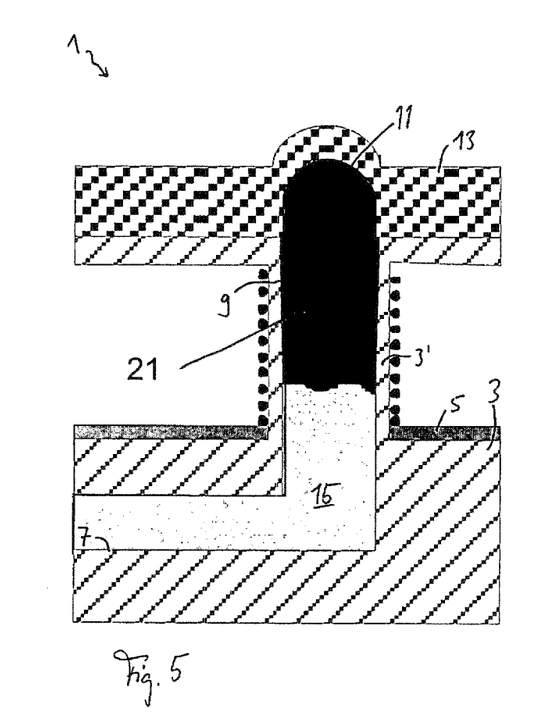
FIG. 5: another exemplary embodiment of the actuator.

FIG. 5 shows a further exemplary embodiment of the actuator 1. This embodiment corresponds substantially to the embodiment shown in FIGS. 3i to 3vi, wherein identical components are designated with identical reference numerals and the description of FIGS. 3i to 3vi also applies to the embodiment shown in FIG. 5. The embodiment of the actuator 1 shown in FIG. 5 comprises sealing medium 21, which is not chemically soluble or physically miscible with the actuator fluid. In other words, a stable phase boundary forms between the actuator fluid 15 and the sealing medium 21.

For example, the sealing medium 21 may contain a paraffin, while the actuator fluid 15 includes a polar solvent, such as water. As shown in FIG. 5, the sealing medium can also enter the actuator chamber 11 or it can also take on the role of the actuator chamber fluid, different to the embodiments shown in FIGS. 1 to 4.

Figure 6:
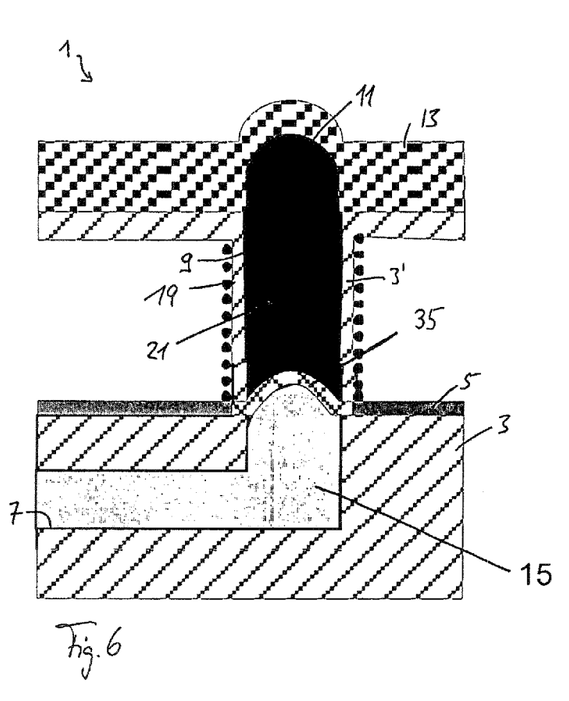
FIG. 6: another exemplary embodiment of the actuator.

FIG. 6 shows a further exemplary embodiment of the actuator 1. This embodiment corresponds substantially to the embodiment shown in FIGS. 3i to 3vi, wherein identical components are designated with identical reference numerals and the description of figures to 3i to 3vi also applies to the embodiment shown in FIG. 6. The embodiment of the actuator 1 shown in FIG. 6 comprises sealing medium 21, which is spatially separated from the actuator fluid 15 by an elastic membrane 35. In other words, the elastic membrane forms a fluid tight barrier between the actuator fluid supply 7 and the actuator fluid supply connection 9, so that the actuator fluid 15 and the sealing medium 21 cannot contact each other directly and mix. Due to the elasticity of the membrane 35, however, a pressure prevailing in the actuator fluid 15 can be transferred to the sealing medium. In the event that the actuator element 13 is deformed, the membrane 35 can deform elastically as well, so that the volume of the actuator chamber 11 and the actuator fluid supply connection 9 remains substantially constant. Advantageously, actuator fluids and sealing media that are miscible with each other or soluble upon direct contact can be used in this embodiment.

What is claimed is:

1. A method for bistably actuating an actuator comprising the steps of:
    applying positive pressure in an actuator fluid supply (7) that is fluidly connected to an actuator chamber (11) by means of an actuator fluid supply connection (9), wherein a working positive pressure is generated in the actuator chamber (11), whereby an actuator element (13) fluidly connected to the actuator chamber (11) is brought from a resting position to an actuation position; and
    pressure-tight sealing of the actuator fluid supply connection (9), so that the working positive pressure in the actuator chamber (11) is maintained and the actuator element (13) remains in the actuation position, wherein, for both the resting position and the actuation position, the actuator element has a stable actuation state that does not require additional energy to maintain the actuator element in the associated position.

2. The method according to claim 1, wherein pressure-tight sealing is performed by means of a liquefiable sealing medium (21), which is disposed in the actuator fluid supply connection (9) in a liquid state and solidifies in the actuator fluid supply connection (9), wherein the actuator chamber (11) is fluidly separated from the actuator fluid supply (7) by the solidified sealing medium (21).

3. The method according to claim 2, further comprising the step of:
    liquefying the sealing medium (21), which is disposed in the actuator fluid supply connection (9) between the actuator chamber (11) and the actuator fluid supply (7) and which fluidly separates the actuator chamber (11) from the actuator fluid supply (7), wherein the molten sealing medium (21) is at least partially displaced toward the actuator chamber (11) upon application of the positive pressure.

4. The method according to claim 3, further comprising the step of:
    releasing the positive pressure or applying negative pressure in the actuator fluid supply (7).

5. The method according to claim 2, further comprising the steps of:

liquefying the sealing medium (21) in a sealing medium reservoir (33);

applying positive pressure to the sealing medium reservoir (33), wherein a sealing element (29a) is brought from an open position to a closed position, so that the actuator chamber (11) is fluidly separated from the actuator fluid supply (7) by the sealing element (29a), and solidifying the sealing medium (21), so that the sealing element (29a) remains in the closed position.

6. The method according to claim 5, further comprising the step of:

releasing the positive pressure or applying negative pressure in the actuator fluid supply (7).

7. The method according to claim 2, further comprising the step of:

releasing the positive pressure or applying negative pressure in the actuator fluid supply (7).

8. The method according to claim 1, further comprising the step of:

releasing the positive pressure or applying negative pressure in the actuator fluid supply (7).

9. The method according to claim 8, further comprising the step of;

liquefying the sealing medium (21) in the actuator fluid supply connection (9), wherein the working positive pressure in the actuator chamber (11) decreases and the actuator element (13) returns from the actuation position to the resting position.

10. A bistable actuator, comprising:

an actuator fluid supply (7) through which an actuator fluid (15) can be provided and which is fluidly connected to an actuator chamber (11) by means of an actuator fluid supply connection (9);

at least one actuator element (13) fluidly connected to the actuator chamber (11), which can be brought from a resting position to an actuation position by application of positive pressure in the actuator chamber (11), wherein, for both the resting position and the actuation position, the at least one actuator element has a stable actuation state that does not require additional energy to maintain the at least one actuator element in the associated position; and a sealing device (19, 21; 21, 29a, 33) with which the actuator fluid supply connection (9) can be sealed in a pressure-tight manner.

11. The actuator according to claim 10, wherein the sealing device (19, 21) comprises a liquefiable sealing medium (21) and a heating element (19) with which the sealing medium (21) can be liquefied.

12. The actuator according to claim 11, wherein the sealing medium (21) is immiscible with the actuator fluid or wherein the sealing medium (21) is fluidly separated from the actuator fluid (15) by an elastic membrane (35).

13. The actuator according to claim 12, wherein the sealing medium (21) is disposed in the actuator fluid supply connection (9).

14. The actuator according to claim 12, wherein the heating element (19) contacts the sealing medium (19) directly or indirectly.

15. The actuator according to claim 11, wherein the sealing medium (21) is disposed in the actuator fluid supply connection (9).

16. The actuator according to claim 15, with a reservoir fluid supply (25), which is fluidly connected to the sealing medium reservoir (33) by means of a reservoir fluid supply connection (27).

17. The actuator according to claim 11, wherein the heating element (19) contacts the sealing medium (19) directly or indirectly.

18. The actuator according to claim 11, wherein the sealing medium (21) is disposed in a sealing medium reservoir (33), which is fluidly connected to a sealing element (29a), which can be brought from an open position to a closed position by application of positive pressure in the sealing medium reservoir (33), so that the actuator chamber (11) can be fluidly separated from the actuator fluid supply (7) by the sealing element (29a).

19. An actuator assembly with at least two actuators (1) according to claim 10, wherein the actuator fluid supplies (7) of the actuators (1) and/or the reservoir fluid supplies (25) of the actuators (1) are fluidly connected to each other.

20. A use of an actuator assembly according to claim 19 as a haptic display device, wherein a plurality of tactile characters can be represented by means of the actuator elements (13) of the actuator assembly.

* * * * *